Jan. 7, 1958
A. BOUWERS
2,818,773
PANORAMIC TELESCOPE
Filed July 24, 1950
3 Sheets-Sheet 1
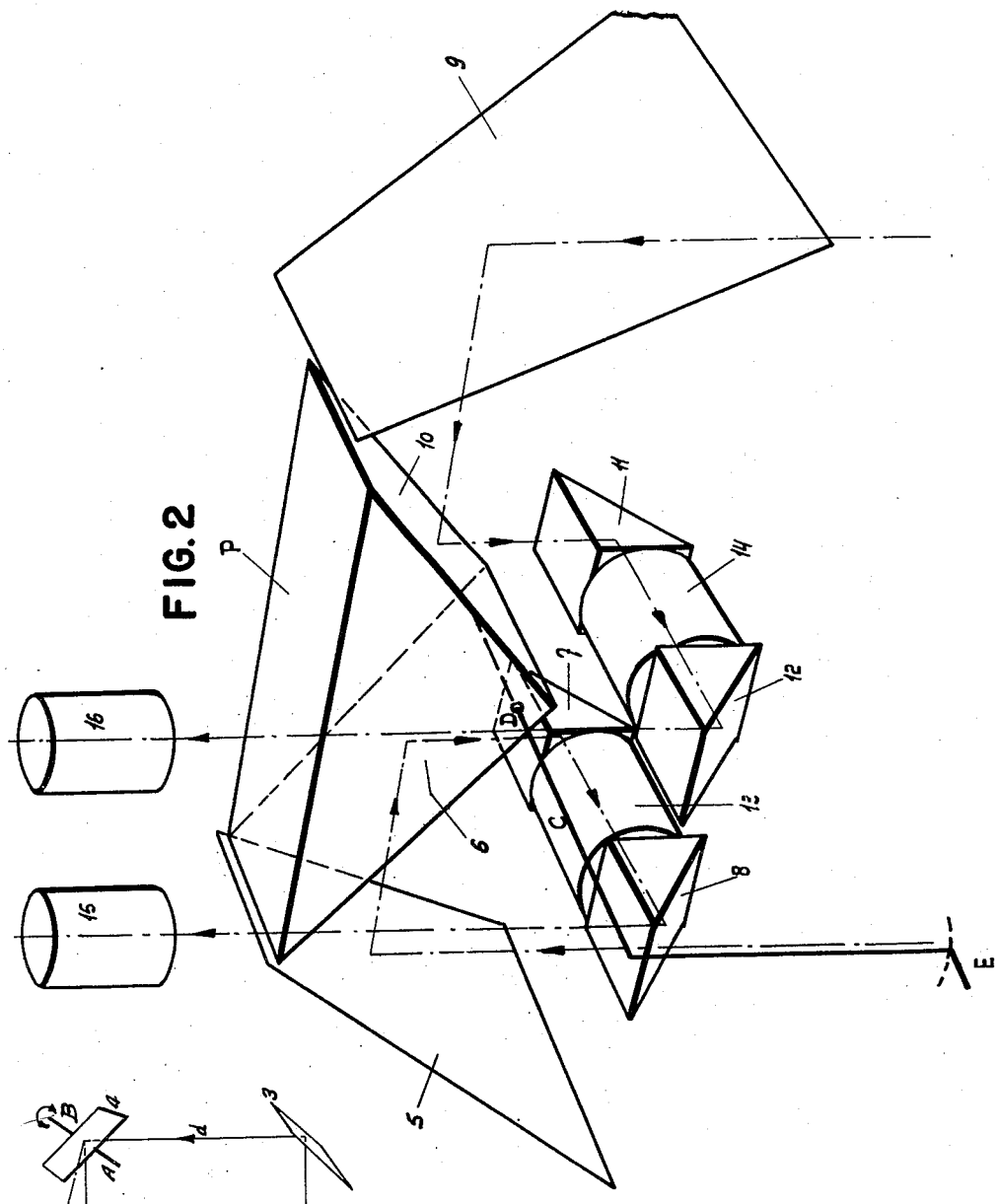
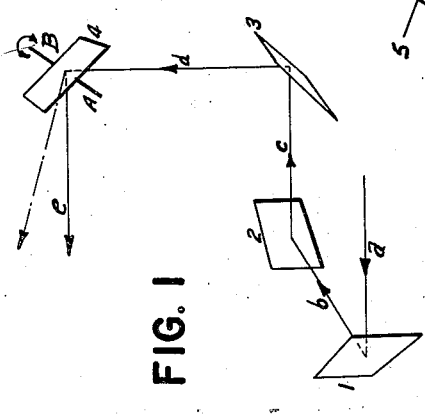
INVENTOR.
ALBERT BOUWERS
BY Wenderoth, Lind & Ponack
ATTORNEYS Jan. 7, 1958 A. BOUWERS 2,818,773
PANORAMIC TELESCOPE
Filed July 24, 1950 3 Sheets-Sheet 2
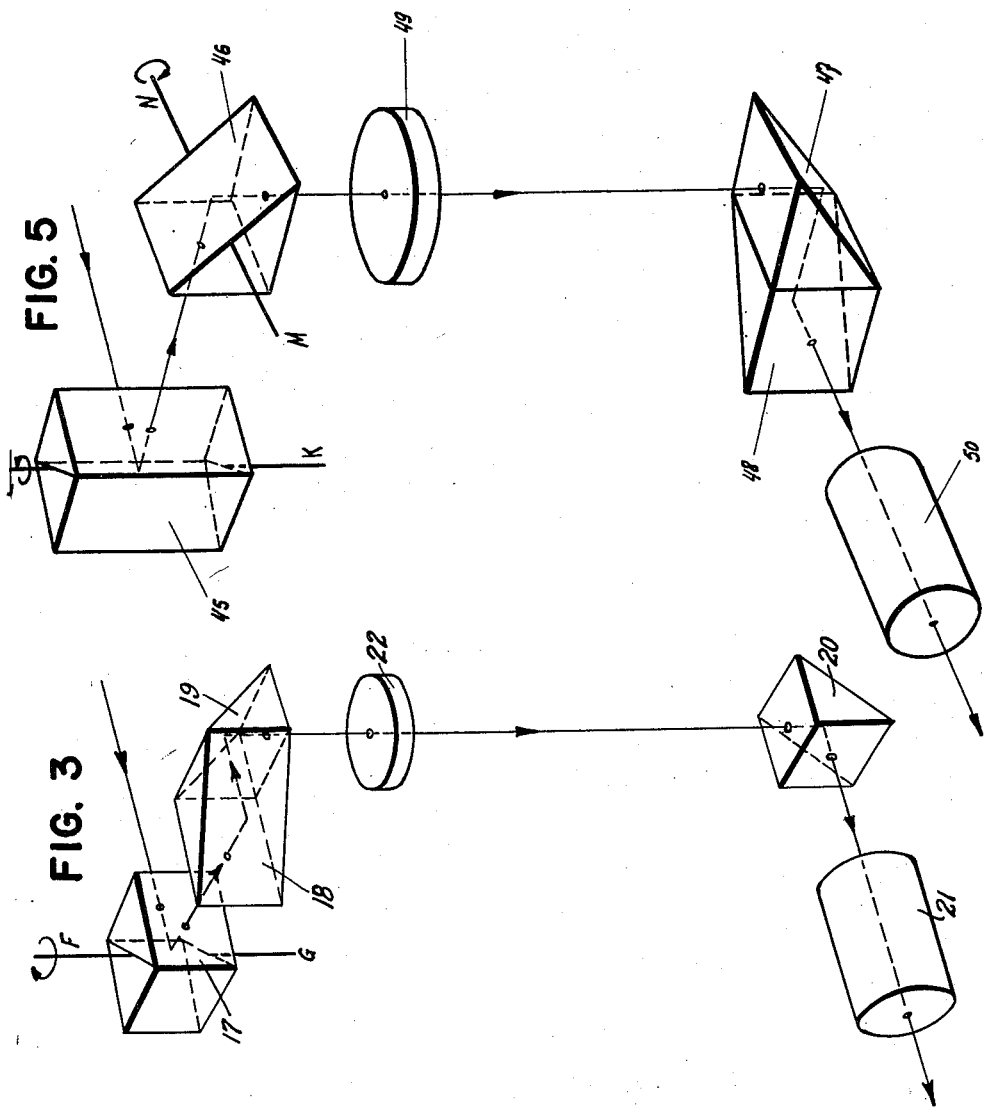
INVENTOR.
ALBERT BOUWERS
BY Wenderoth, Lind & Ponack
ATTORNEYS Jan. 7, 1958  A. BOUWERS  2,818,773
PANORAMIC TELESCOPE Filed July 24, 1950  3 Sheets-Sheet 3

INVENTOR
ALBERT BOUWERS

United States Patent Office 2,818,773
Patented Jan. 7, 1958

2,818,773
PANORAMIC TELESCOPE

Albert Bouwers, The Hague, Netherlands, assignor to N. V. Optische Industrie "De Oude Delft," Delft, Netherlands Application July 24, 1950, Serial No. 175,613

Claims priority, application Netherlands August 10, 1949

1 Claim. (Cl. 88—33)

This invention relates to inverting systems for optical instruments and the like, which permit of observing successively different parts of a large field of view.

As an example of such instruments, we may mention a panoramic telescope which allows of exploring the horizon. In the conventional panoramic telescopes use is made of a prism system as illustrated, for example, in Fig. 177 of "Fundamentals of Optical Engineering" by Donald H. Jacobs, New York-London, 1943. It is constituted by a 45° prism, a Dove-prism and a roof-prism of Amici. This system is fairly complicated in optical respect and furthermore involves the more important mechanical complication that in exploring the horizon, the Dove prism is required to rotate about a vertical axis at half the angular speed at which the 45° prism is rotated about this axis. The object of the invention is to provide an inverting system in which the said optical and mechanical complications are obviated.

According to the invention, this is ensured in an inverting system which provides complete erection of image by means of 4 reflecting surfaces, and which is characterised in that one or more of these surfaces is or are rotatable about an axis which is perpendicular to the plane of incidence of a light ray incident upon the surface concerned according to the optical axis. It is evident that the reflecting surfaces may be realised in different ways known per se. Thus, for example, it is possible to use first surface mirrors or the total-reflecting hypotenuse surfaces of ordinary 45° prisms.

According to the invention, use may be made of an inverting prism which is characterised in that the 4 reflecting surfaces, in one position, have a relative position corresponding to that of a prism inverting system according to Porro of the first or second kind. This system may be constructed in a very simple manner and general uses thereof are described in detail hereinafter. However, within the scope of the invention, use may be made of any system having 4 reflecting surfaces and providing complete erection of image, such, for example, as two 45° prisms in conjunction with a pentaprism or two 45° prisms with a 135° prism having two total-reflecting surfaces. When the system according to the invention is applied to panoramic telescopes, the first reflecting surface at which the light rays emanating from the object are reflected is made rotatable according to the present invention.

In another use of the inverting system according to the invention, for example in so-called plot telescopes on board ships, the second reflecting surface may be made rotatable in the manner described in the claim. The invention will now be described more fully by reference to the accompanying drawing showing, by way of example, one embodiment thereof.

Fig. 1 illustrates diagrammatically a four mirror inverting system in which the first mirror is rotatable.

Fig. 2 illustrates a binocular plot telescope utilizing movable reflecting surfaces in the inverting systems.

Fig. 3 illustrates a panoramic telescope utilizing a prism inverting system.

Fig. 5 illustrates a modified form of the panoramic telescope of Fig. 3 in which both the first and second reflecting surfaces are rotatable.

Figure 4:
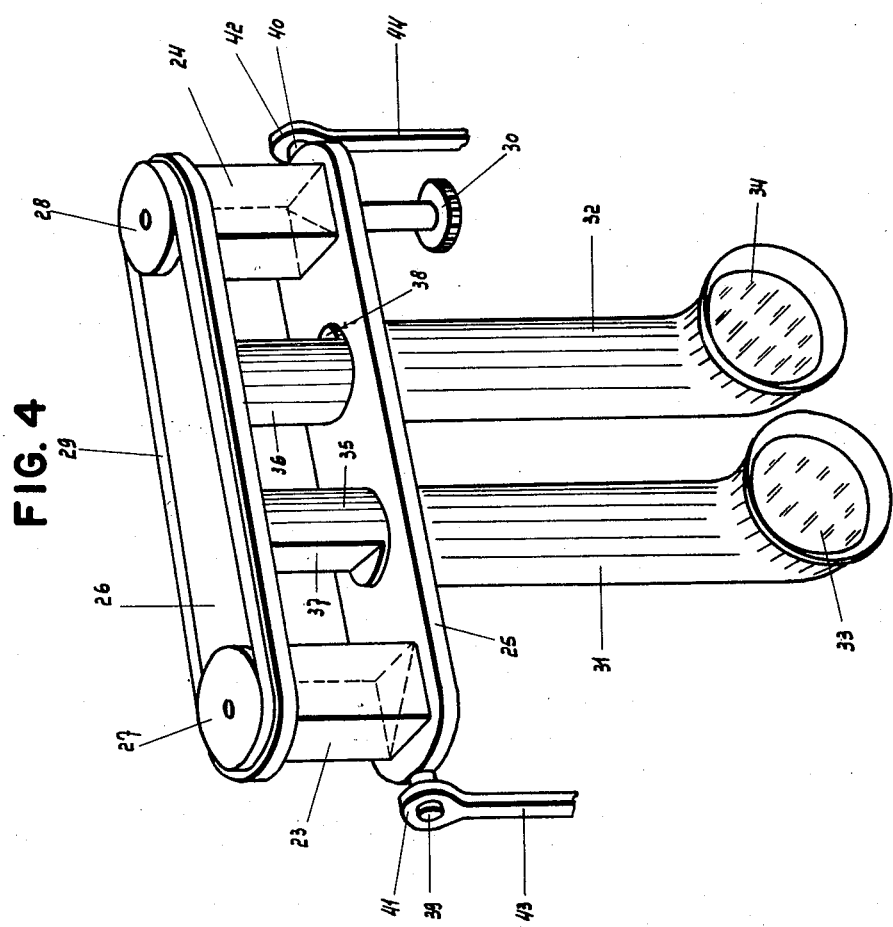
Fig. 4 illustrates a binocular form of the panoramic telescope of Fig. 3.

Fig. 1 shows four mirrors 1, 2, 3, 4, of which the relative positions correspond to those of the four reflecting surfaces of a Porro prism system of the first kind. The figure also shows the light ray *abcde*, which travels according to the optical axis and which is reflected successively at the mirrors 1, 2, 3 and 4. Mirror 4 is rotatable about an axis AB, which is at right angles to the plane of incidence of portion *d* of the light ray travelling according to the optical axis. When mirror 4 is turned about the axis AB observations may be made in any direction perpendicular to AB. The system continues to invert completely, whilst image shifts do not occur. This result is obtained with a single rotation of the mirror 4, whilst the other mirrors keep in position. Exactly the same result may be obtained by making mirror 4 to be stationary, but mirror 3 to be rotatable about an axis which is at right angles to the portions *c* and *d* of the local optical axis.

One practical example is shown diagrammatically in Fig. 2, which shows the inverting system according to the invention when used in a binocular plot telescope. Such plot telescopes are used on board vessels to read from the navigation bridge a map provided under the bridge. The inverting system must be of a compact construction and furthermore a maximum portion of the map must be observable. More particularly the use of radar on board ships necessitates to view longer plot tables than was possible with the systems employed hitherto. The form of telescope according to the invention as shown in Fig. 2 permits indeed of looking over this large plot table indispensable for radar.

The light rays emanating from the map strike successively reflecting surfaces 5, 6, 7, 8 and 9, 10, 11, 12 respectively. The mirrors 6 and 10 are constituted by two surfaces of a prism P. This prism can rotate about an axis CD by means of a handle E. This rotation has the effect of shifting the field of view in the two telescopes, that is to say that another portion of the map is observed.

The telescope objectives 13 and 14 are positioned between the prisms 7, 8 and 11, 12 respectively. The observer looks into eye-pieces 15 and 16. The desired result is thus obtained here in an exceptionally simple manner. The binocular telescope comprises only one rotary prism which does not involve image shift.

Fig. 3 shows the skeleton diagram of an inverting system according to the invention which is adapted to be used in panoramic telescopes and then leads to considerable simplifications and improvements as compared with known types. The reflecting surfaces 17, 18, 19 and 20 are constituted by the hypotenuse surfaces of the prisms illustrated. The light ray shown extends according to the optical axis and reaches via the surfaces 17, 18, 19 the objective 22 and via surface 20 the eye-piece 21. The two prisms of which the adjacent hypotenuse surfaces constitute the surface 17—which thus is reflecting on both sides—are jointly rotatable about an axis FG, imagined to be vertical. When this prism system is rotated, all parts of the horizon are successively made visible in the telescope field owing to the reflection at both sides of mirror 17, except the small portion where the prism system 18, 19 forms an obstacle. This result is again obtained with surprisingly simple means and without image shift.

Fig. 4 is a view of a binocular panoramic telescope, which is constituted by two telescopes constructed according to the principle of Fig. 3. The mirrors 23 and 24, each of which is constituted by two prisms, are each rotatable about a shaft supported in two parallel plates 25 and 26. Provided on these shafts are wheels 27 and 28, which are interconnected by a rope 29. The shaft of the reflecting prism 24 furthermore carries a knob 30. Secured to the plate 25 are telescope tubes 31 and 32 containing the objectives (not shown) and eye-pieces 33 and 34. In alignment with the tubes 31 and 32 extend tubes 35 and 36 having apertures 37 and 38 on the sides of the mirrors 23 and 24 respectively. Each of the tubes 35 and 36 houses a prism system (not shown) corresponding to the prism system 18, 19 of Fig. 3, whilst the tubes 31 and 32 at their bottom each comprise a system (likewise not shown) corresponding to prism 20 in Fig. 3.

Pins 39 and 40 are rigidly secured to the plate 25 and rotatable in pivots 41 and 42 which, in turn, are rigidly secured to vertical rods 43 and 44. The latter are fixed, for example, with respect to the surface of the earth. An observer looking through the eye-pieces 33 and 34 can explore the whole of the horizon by turning the knob 30, by which the surfaces 23 and 24 rotate simultaneously and at the same speed so as to remain relatively perpendicular. It is of particular importance that the small interruption in the field of view of one telescope is not interfering since the other telescope yields no interruption in the position concerned.

Finally, it is possible to explore also in the vertical direction by turning the whole of the telescope about the pins 39 and 40. Fig. 5 shows a further embodiment of the inverting system according to the invention. The four reflecting surfaces 45, 46, 47, 48 are constituted by the hypotenuse surfaces of the prisms shown. In the position as illustrated, the position of these surfaces corresponds to that in the prism system according to Porro of the second kind. The figure furthermore shows an objective 49 and an eye-piece 50. The prism 45 is rotatable about a shaft KL so that—when this shaft is supposed to be vertical—substantially the whole of the horizon can be explored in succession, similarly as in the arrangement of Fig. 3. However, here the prism 46 is also rotatable, and this about an axis MN. Rotation about this axis implies that the field of view may also be explored in the vertical direction. In view thereof, the prism 45 has a fairly great length in the direction KL, in order to enlarge the field of view in the vertical direction as much as possible. Consequently, this extremely simple arrangement provides a panoramic telescope having a large field of view in both the horizontal and the vertical direction.

What I claim is:

In a panoramic telescope having an objective and an eye piece, an inverting system comprising a set of four reflecting surfaces arranged in optical alignment, a first and second of said four reflecting surfaces being located in the object space of said objective so as to successively reflect light rays before entering said objective, the first reflecting surface being disposed vertically and rotatable about a vertical axis so as to permit scanning of the object space in a horizontal direction, the second reflecting surface being rotatable about a horizontal axis parallel to said second reflecting surface so as to permit scanning of the object space in vertical direction through an angle predetermined by the height of said first reflecting surface, a third and fourth of said reflecting surfaces being fixedly mounted so as to successively reflect light rays travelling from the objective towards the eye piece, the third reflecting surface being disposed under an angle of 45° with respect to the optical axis of the objective and the fourth reflecting surface being disposed under an angle of 45° with respect to the optical axis of the eye piece, the distance between said first and said second reflecting surfaces and between said second reflecting surface and said objective being as small as permitted by the rotational movements of said first and second reflecting surfaces.

References Cited in the file of this patent

UNITED STATES PATENTS

| 1,000,607 | Kellner | Aug. 15, 1911 |
| 2,625,853 | Hayward | Jan. 20, 1953 |
| 2,625,854 | Hayward | Jan. 20, 1953 |

FOREIGN PATENTS

| 389,417 | France | Jan. 27, 1908 |
| 274,912 | Great Britain | Jan. 25, 1927 |
| 736,186 | France | Sept. 12, 1932 |